United States Patent Office 3,384,590
Patented May 21, 1968

3,384,590
ANTI-CORROSIVE SALT
Russell A. Eversole, Excelsior, and Young J. Lee, Minneapolis, Minn., assignors to Cargill, Incorporated, Bloomington, Del., a corporation of Delaware
No Drawing. Filed Nov. 25, 1964, Ser. No. 413,995
16 Claims. (Cl. 252—70)

ABSTRACT OF THE DISCLOSURE

A salt composition for de-icing including a de-icing salt and minor but effective amounts of an alkali metal chromate or nitrite anodic passifier and an organic compound cathodic passifier having an amino nitrogen atom and an alkyl radical of from 8 to 24 carbon atoms.

---

This application is a continuation-in-part of application Ser. No. 336,861, filed Jan. 10, 1964, and now abandoned.

This invention relates generally to an improved salt composition, and more particularly relates to a salt composition for de-icing having improved anti-corrosive characteristics. The invention also relates to a method of manufacturing a salt composition containing such anti-corrosive agents.

The corrosive effect of an aqueous solution of soluble salts, particularly halogen salts such as sodium chloride and calcium chloride, on metal surfaces is well known. Halogen salts such as sodium chloride and calcium chloride are particularly useful as freezing point depressants for de-icing, e.g., for melting ice and snow on streets and sidewalks. However, the aqueous sodium chloride and calcium chloride solutions that are formed when these salts are employed to melt ice and snow are corrosive and when these salt solutions are splashed upon the underside of a car, corrosion problems occur.

Various agents, such as alkali hexameta-phosphates and alkali chromates, have been mixed with halogen salts in an attempt to reduce the corrosive effect of these salts, when employed as ice melting compounds. However, attempts to reduce the corrosive effect of halogen salts have been generally unsuccessful and corrosion usually results when an aqueous solution of a halogen salt contacts metal surfaces.

It is a principal object of the present invention to provide a salt composition for de-icing having improved anti-corrosive characteristics. It is another object to provide a soluble halogen salt composition which has improved anti-corrosive characteristics in an aqueous medium. An additional object is to provide a method of manufacturing a salt composition having improved anti-corrosive characteristics. Yet another object of the invention is to provide an improved salt composition containing anti-corrosive agents for preventing corrosion of metallic surfaces in contact with an aqueous solution of the salt. A further object is to provide an anti-corrosive salt composition which does not segregate upon handling.

These and other objects of the invention are more particularly set forth in the following detailed description.

Generally, the present invention comprises a water soluble salt composition of improved anti-corrosive characteristics containing suitable anti-corrosive agents which provide binary passivation to a metallic surface in contact with an aqueous solution of the salt. More specifically, the present invention is directed to a salt composition having improved anti-corrosive properties comprising, a water soluble salt containing minor, but effective, amounts of an anodic passifier selected from the group consisting of alkali metal chromates, alkali metal nitrites and mixtures thereof, and a cathodic passifier which may be defined as a cationic surface active agent selected from organic compounds containing an amino nitrogen atom and an alkyl radical having from 8 to 24 carbon atoms or mixtures thereof. The cathodic passifier exhibits a strong positive charge in solution. For purposes of the present invention the term "cationic surface active agent" includes those compounds that are sometimes referred to as amphoteric surface active agents, e.g., compounds which may be either cationic or anionic. Also, the term "amino nitrogen atom" is intended to include a quaternary nitrogen atom. Further, the term "alkali metal chromates" is intended to include both alkali metal chromates and alkali metal dichromates.

Cationic surface active agents which include an amino nitrogen atom and a long chain alkyl radical, and which exhibit a significant positive charge in solution include the following general groups of organic compounds:

(1) N-alkyl-diamines

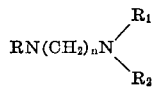

(2) N-alkyl-triamines

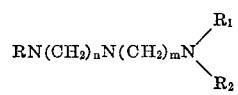

(3) N-γ alkyl oxypropyl-diamines

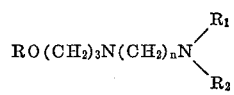

(4) N-γ alkyl oxypropyl-triamines

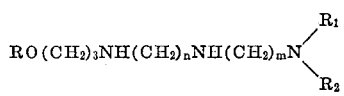

(5) N-alkyl β amino propionic acids $$RNH[(CH_2)_2COOH]_q$$

(6) N-γ alkyl oxypropyl-β amino propionic acids $$RO(CH_2)_3NH[(CH_2)_2COOH]_q$$

(7) Alkyl quaternary ammonium compounds

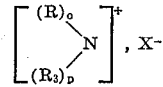

(8) Alkyl oxypropyl quaternary ammonium compounds

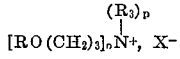

(9) Alkyl diethanol benzyl quaternary ammonium compounds

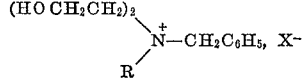

(10) N-β alkyl amidoethyl-ethylene amines

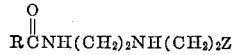

(11) N-alkyl-N-ethyl-ethanol amines

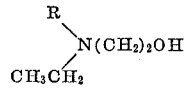

(12) 1-ethyl, 2-alkyl imidazolines

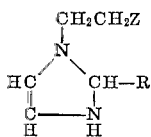

where:

$R$ = an alkyl radical of from 8 to 24 carbon atoms
$R_1$ = hydrogen or a short chain alkyl radical of from 1 to 6 carbon atoms
$R_2$ = hydrogen or a short chain alkyl radical of from 1 to 6 carbon atoms
$R_3$ = a short chain alkyl radical of from 1 to 6 carbon atoms
$X$ = a salt forming radical
$Z$ = an amino or hydroxyl radical
$n$ = 2 to 10
$o$ = 1 to 3
$p$ = 1 to 3
and the sum of $o$ and $p$ is 4
$q$ = 1 or 2
$r$ = 0 or 1
and the sum of $q$ and $r$ is 2.

It is understood that the cationic surface active agents may be present in the form of soluble salts, and in some instances the salt form is preferred.

Specific examples of cationic surface active agents which are suitable cathodic passifiers include N-alkyl-etheylene diamine; N-alkyl-diethylene triamine; N-alkyl-1,3 propylene diamine; N-alkyl-dipropylene triamine; N-γ alkyl oxypropyl-N'-alkyl-ethylene diamine; N-γ alkyl oxypropyl-1,3 propylene diamine; N-γ alkyl oxypropyl-dipropylene triamine; N-alkyl-β amino propionic acid; N-alkyl-β iminodipropionic acid; N-γ alkyl oxypropyl-β aminopropionic acid; N-γ alkyl oxypropyl-β iminodipropionic acid; alkyl trimethyl ammonium chloride; dialkyl dimethyl ammonium chloride; mono, di and tri gamma alkyl oxypropyl ammonium chloride; alkyl diethanol benzyl ammonium chloride; N-β alkyl amidoethyl-ethylene diamine; N-β alkyl amidoethyl-ethylene diamine; N-β alkyl amidoethyl-ethanol amine; N-alkyl-N-ethyl ethanol amine; 1-ethanol amine, 2-alkyl, imidozoline; 1-ethanol, 2-alkyl, imidazoline, or salts thereof.

The alkyl radical of the cationic surface active agent may be any alkyl having from 8 to 24 carbon atoms. Preferred alkyl radicals include the alkyl radicals obtained from coconut oil, tallow, soybean oil, tall oil, and other triglycerides, as well as the alkyl radicals obtained from long chain carboxylic acids.

Binary passivation of a metallic surface in contact with a water soluble corrosive salt occurs when the salt solution contacting the metallic surface contains an anodic passifier and a cathodic passifier. As used herein, passivation of a metallic surface occurs when the metallic surface substantially resists oxidation in an environment where there is a large decrease in the free energy of the metal when the metal is oxidized to a metallic oxide, i.e., when corrosion takes place. Thus, when a metal is passivated, the metal is made resistant to corrosion.

Corrosion of a metal occurs when the metal is oxidized to the appropriate metallic oxide. In general, the oxidation of a metal is an electrochemical reaction, electric currents flowing between random anodic areas and cathodic areas on the surface of the metal. Binary passivation includes the use of a soluble cathodic passifier having a strong positive charge in solution which is attracted to the negative cathodic areas on the metallic surface, and the use of a soluble anodic passifier which carries a strong negative charge and is attracted to the positively charged anodic areas on the metallic surface.

The cathodic passifier is a soluble compound which has a strong positive charge in solution and which has good film forming properties which cause the cathodic passifier to form a continuous molecular film over the relatively large cathodic areas of the metallic surface. The film formed by the cathodic passifier serves as a galvanic barrier and prevents the corrosive salt solution from contacting the cathodic areas of the metallic surface.

The anodic passifier is desirably a soluble ion having a strong negative charge in solution. The anodic passifier should be readily reducible and should preferentially react with partially oxidized metallic ions and not with free metallic ions. Additionally, the reduction product of the anodic passifier is preferably insoluble and is retained at the surface of the anodic areas along with the insoluble metallic oxide film formed by corrosion of the metallic surface to form a galvanic barrier at the anodic areas of the metallic surface. In this connection, while nitrates are suitable as anodic passifiers, the reduction product of the nitrate ion is ammonia which is soluble and is not retained in the metallic oxide film formed at the surface of the anodic areas.

Thus, binary passivation is used to describe an anti-corrosive system wherein selective anti-corrosive agents are combined, certain of the anti-corrosive agents passivating the cathodic areas of the metallic surface and other of the anti-corrosive agents passivating the anodic areas of the metallic surface. In some instances it may be desirable to utilize mixtures of two or more of the anodic passifiers and/or cathodic passifiers.

The binary passivation of metallic surfaces is of particular importance where a soluble halogen salt, for example sodium chloride or calcium chloride, comes in contact with metallic iron. One of the major uses of soluble halogen salts is as a freezing point depressant to effect de-icing in the melting of ice and snow from streets and sidewalks. When sodium chloride or calcium chloride is used as an ice melting salt the sodium chloride and/or calcium chloride solution thus formed is splashed upon the under surface of vehicles traveling along the road. The presence of the chloride salt solution in contact with the under surface of the vehicle causes pitting and rusting of the body of the vehicle.

While the manner in which the invention performs is not altogether understood, the following may occur. When an aqueous solution contacts an iron containing surface, the iron in contact with the water and oxygen is oxidized to ferrous hydroxide at the surface of the metal. Ferrous hydroxide is soluble in water to the extent of a fraction of a milligram per 100 parts of water, and is generally considered insoluble. However, ferrous hydroxide is the most soluble of the various iron oxides that might be formed, and is substantially more soluble than those iron oxides which have a cubic crystalline structure, e.g., gamma ferric oxide, magnetite and the like. In the absence of other soluble ions in the aqueous solution, the ferrous hydroxide is further oxidized to an intermediate non-cubic iron oxide which is more insoluble than ferrous hydroxide but which is more soluble than the cubic iron oxides. When the aqueous solution does not contain additional soluble ions, it does not appear that significant amounts of the cubic iron oxides are formed. An insoluble film of corrosion products is formed upon the metallic iron surface which tends to prevent further corrosion of the iron surface. However, if chloride ions are also present in the aqueous solution, they react with the metallic iron surface to form ferrous chloride and ferric chloride, both of which are highly soluble in water. The removal of these soluble chloride compounds from the iron surface continuously exposes fresh iron to corrosion and causes erosion and pitting of the surface. The reaction between the iron and chloride ions to form soluble ferrous chloride and ferric chloride interferes with the formation of the insoluble iron oxides and substantially reduces the formation of the insoluble film of corrosion products on the iron surface.

It has been discovered that the corrosion of a metallic surface by an aqueous halide salt solution, e.g., sodium chloride, can be substantially prevented by the combined use of an anodic passifier and a cathodic passifier. For example, a de-icing salt composition containing a sodium chromate anodic passifier and a N-coconut-1,3 propylene diamine diacetate cathodic passifier substantially prevents corrosion of a metallic iron surface in contact with an aqueous solution of the anti-corrosive salt.

The sodium chromate anodic passifier is attracted to the anodic areas of an iron containing surface due to its strong negative charge. The sodium chromate reacts preferentially with ferrous hydroxide as opposed to the metallic iron, and promotes the oxidation of the ferrous hydroxide to gamma ferric oxide as opposed to the more soluble intermediate iron oxides. It is believed that the sodium chromate is reduced to chromic oxide which is retained in the insoluble gamma ferric oxide film formed upon the surface of the anodic areas and aids in the formation of a galvanic carrier at the anodic areas of the iron surface. Thus, in the presence of an anodic passifier, the film of corrosion products formed at the anodic areas of the iron surface is substantially more insoluble and the corrosion of the iron surface by the chloride ions is reduced.

The N-coconut-1,3 propylene diamine diacetate is attracted to the negative cathodic areas of the iron surface where it forms a molecular film, i.e., a galvanic and physical barrier, over the cathodic areas of the surface of the iron. The formation of galvanic barriers at both the cathodic and anodic areas of the metallic surface substantially reduces the flow of current driving the electrochemical corrosive reactions, and diminishes contact of the chloride ions, moisture, and oxygen with the iron surface, thereby reducing the corrosion of the metallic surface.

An anti-corrosive salt composition may be manufactured by mixing a granular salt, e.g., sodium chloride or calcium chloride, with effective amounts of an anodic passifier and a cathodic passifier. The anti-corrosive salt should be manufactured in a manner so that the anodic passifier and cathodic passifier are not separated from the salt due to dusting or segregation during handling or transportation of the salt. In order to prevent dusting and segregation it has been found that either the anodic passifier or cathodic passifier may be admixed with the salt in liquid form, if so desired. Generally, the cathodic passifier, e.g., a N-alkyldiamine salt, is mixed with the granular salt in liquid form since it will normally be a liquid.

A granular anti-corrosive salt, e.g., rock salt, may be manufatured by forming an intimate dray mixture of rock salt and an anodic passifier, e.g., sodium chromate. The anodic passifier should be employed in an effective amount which retards corrosion of the metallic surface when combined with a particular cathodic passifier. Generally, as little as 0.05 percent by weight of the granular salt of the anodic passifier will be an effective amount, although in some instances, lesser amounts may be employed. There is no apparent upper limit to the amount of anodic passifier that may be utilized. However, when the anodic passifier is employed in amounts in excess of one percent by weight of the granular salt, the increase in the amount of anodic passifier generally does not provide proportionally increased protection against corrosion.

An anti-caking agent such as sodium ferrocyanide is desirably included in the dry mixture of granular salt and anodic passifier. The anti-caking agent may be employed in an amount of about 0.05 percent by weight of the salt, or in any suitable amount which will prevent caking thereof.

The dry mixture of salt, anodic passifier and anti-caking agent then may be sprayed with an aqueous solution of the cathodic passifier, e.g., N-coconut-1,3 propylene diamine diacetate, and the mixture is suitably agitated to insure even distribution of the cathodic passifier solution over the surface of the salt. The cathodic passifier forms a film on the surface of the salt granules and acts as a binder for the anodic passifier and anti-caking agent, thus preventing segregation or sifting of these materials during handling and transportation of the anti-corrosive salt. The cathodic passifier is employed in an amount which is effective to retard corrosion of the metallic surface in combination with the anodic passifier. Generally, the cathodic passifier solution is of a suitable concentration to provide at least 0.01 percent, preferably 0.5 percent by weight of the granular salt of the cathodic passifier. As with the anodic passifier, there is no apparent upper limit to the amount of cathodic passifier that may be employed, and up to about two percent by weight or more of the granular salt of the cathodic passifier may be utilized if desired.

It is advantageous to include a dispersing agent in the aqueous solution of the cathodic passifier that is sprayed on the salt. The dispersing agent may be employed in an amount suitable to aid in dispersing the cathodic passifier and .01 percent to about 0.1 percent by weight of the salt of a nonionic surface active agent sold under the tradename "Makon 10" has been found to be particularly suitable. Other dispersing agents that may be employed include "Triton X–200," an anionic surface active agent; "Triton X–100," a nonionic surface active agent and "Triton QS–15," an amphoteric surface active agent. The use of other suitable dispersing agents is also contemplated.

A suitable dye may also be included in the cathodic passifier solution in order that the anti-corrosive salt will be distinguishable from untreated salt.

After the cathodic passifier solution is mixed with the salt, the moist salt may be dried to remove the excess moisture present therein. The salt may be heated in a suitable oven or may be stored for a period of time in a storage of low humidity. Regardless of the particular method of drying selected, the anti-caking agent prevents caking of the salt and a granular free flowing salt of substantially improved anti-corrosive characteristics is obtained.

It is apparent that other manners of preparing the anti-corrosive salt are available to those skilled in the art. In this connection, it is possible to spray the salt with an aqueous solution of both the anodic passifier and cathodic passifier, or to add the cathodic passifier in dry form and spray on the anodic passifier, or to add all the chemicals in a dry form.

In a specific embodiment of the manufacture of an anti-corrosive salt, 100 tons of rock salt, 200 pounds of sodium and 100 pounds of sodium ferrocyanide are intimately mixed together, as by tumbling, in order that the sodium chromate and sodium ferrocyanide are intimately distributed through out the salt. 1,000 pounds of N-coconut-1,3 propylene diamine diacetate in a 20 percent water solution are sprayed onto the salt mixture through a metering spray nozzle. The salt is tumbled and mixed during and after being sprayed in order to distribute the fatty diamine salt and dye substantially throughout the salt. About 1 to 20 pounds of water per ton of salt are added to the sailt mixture during the spraying operation and the salt is allowed to dry in a warm storage area of low humidity in order to allow moisture to evaporate from the salt. The presence of the sodium ferrocyanide anti-caking agent prevents caking of the moistened salt.

The salt product obtained is granular and free flowing in nature. The combined anodic passifier and cathodic passifier are intimately distributed upon the surface of each of the salt granules. When brine or an aqueous solution of the salt is present on a roadway or in contact with metal equipment, a metal surface in contact with the aqueous salt solution is substantially protected from corrosion by the presence of the sodium chromate anodic passifier and the N-coconut-1,3 propylene diamine di acetate cathodic passifier.

The following tables illustrate certain specific embodiments of the invention described, and substantiate the improved corrosion resistance obtained in an aqueous halide salt solution containing an anodic passifier and a cathodic passifier.

In each of Tables I to IX the test procedure is carried out according to the following.

Cold-rolled steel panels, similar in composition to those employed in the fabrication of automobile bodies, two inches by three inches and about 0.0343 inch thick, are employed as test panels. The mechanically sheared edges of each of the panels are sanded smooth and the panels are degreased with a 5:1 volume ratio of a carbon tetrachloride-benzene mixture. The panels are then cleaned with a detergent, rinsed thoroughly in water and alcohol and dried in a desiccator under vacuum.

Three panels are employed to test each of the anticorrosive salt compositions. The three panels are accurately weighed and are immersed in a 10 percent by weight sodium chloride brine solution containing the various anodic and cathodic passifiers having a volume of 1,000 milliliters for a period of one hour. The panels are then air dried for six hours and re-immersed in the same brine for an additional hour after which the panels are withdrawn from the brine and air dried for a sixteen hour period. This twenty-four hour cycle test procedure is repeated for two additional twenty-four hour periods to give a total test period of seventy-two hours. At the end of each twenty-four hour cycle one of the panels is removed from the brine. The corrosion products upon the surface of the panel are removed from the panel by cleaning with a brush and detergent. The panel is rinsed with water and dried quickly in a desiccator under vacuum. The dried panel is weighed on an analytical balance to determine the weight loss of the panel due to corrosion.

The tests are conducted in a room having a temperature of 48° F. and a relative humidity of 98 percent. The brine solutions are thoroughly agitated four times per day to insure equilibrium concentrations throughout.

The rate of corrosion is expressed in terms of percent weight loss of the panel and percent protection afforded to the panel by the corrosion inhibitors present in the brine as compared to control test panels which are taken from the same metal stock and which are immersed in a ten percent sodium chloride brine that is free of anticorrosive agents for the same periods of time and under the same conditions as the panels immersed in the brine containing the anti-corrosive agents. Inasmuch as different control panels are employed for various of the examples, slight variations in the results obtained are to be expected. Calculations of the percent weight loss and the percent protection are as follows:

$$\text{Percent weight loss} = \frac{\text{Weight Loss of Panel}}{\text{Weight of Original Panel}} \times 100$$

$$\text{Percent protection} = 100 - \frac{\text{Percent Weight Loss of Test Panel}}{\text{Percent Weight Loss of Control Panel}} \times 100$$

TABLE I.—RATE OF CORROSION AND PERCENT PROTECTION OF COLD-ROLLED STEEL IN 10 PERCENT AQUEOUS SODIUM CHLORIDE BRINE

| Example | Corrosion inhibitors, percent of brine | 24 Hours Percent Wt. loss | 24 Hours Percent Protection | 48 Hours Percent Wt. loss | 48 Hours Percent Protection | 72 Hours Percent Wt. loss | 72 Hours Percent Protection |
|---|---|---|---|---|---|---|---|
| 1 | 0.0175 N-tallow-1,3 propylene diamine hydrochloride. | 0.0378 | 97.32 | 0.1583 | 58.34 | 0.2743 | 58.88 |
| 2 | 0.0125 N-coconut-1,3 propylene diamine acetate. | 0.0396 | 79.61 | 0.1235 | 70.10 | 0.2326 | 65.99 |
| 3 | 0.0125 N-coconut-1,3 propylene diamine hydrochloride. | 0.0251 | 98.16 | 0.0746 | 80.37 | 0.1542 | 76.88 |
| 4 | 0.0062 N-coconut-1,3 propylene diamine hydrochloride. | 0.0254 | 98.14 | 0.0724 | 80.95 | 0.1469 | 77.98 |
| 5 | 0.006 N-coconut-1,3 propylene diamine hydrochloride. / 0.006 Makon 10. | 0.0339 | 63.68 | 0.0946 | 74.17 | 0.1757 | 70.22 |
| 6 | 0.004 N-coconut-1,3 propylene diamine hydrochloride. / 0.004 Makon 10. | 0.0395 | 57.68 | 0.1198 | 67.28 | 0.1855 | 68.57 |
| 7 | 0.002 N-coconut-1,3 propylene diamine hydrochloride. / 0.002 Makon 10. | 0.0456 | 51.22 | 0.1556 | 57.49 | 0.2247 | 61.92 |
| 8 | 0.006 N-coconut-1,3 propylene diamine diacetate. / 0.006 Makon 10. | 0.0324 | 65.28 | 0.1142 | 68.80 | 0.2163 | 63.35 |
| 9 | 0.004 N-coconut-1,3 propylene diamine diacetate. / 0.004 Makon 10. | 0.0328 | 64.91 | 0.1399 | 61.79 | 0.2465 | 58.23 |
| 10 | 0.002 N-coconut-1,3 propylene diamine diacetate. / 0.002 Makon 10. | 0.0374 | 59.99 | 0.1648 | 54.98 | 0.2493 | 57.75 |
| 11 | 0.01 N-coconut-1,3 propylene diamine diacetate. / 0.001 Makon 10. | 0.0329 | 59.18 | 0.0635 | 86.57 | 0.1352 | 84.08 |
| 12 | 0.01 N-coconut-1,3 propylene diamine diacetate. / 0.001 Makon 10. | 0.0176 | 94.09 | 0.1179 | 78.08 | 0.318 | 57.4 |
| 13 | 0.01 N-coconut-1,3 propylene diamine diacetate. / 0.001 Makon 10. | | | 0.1907 | 32.3 | 0.3017 | 44.7 |
| 14 | 0.01 coconut trimethyl ammonium chloride. | 0.111 | 57.0 | 0.309 | 30.72 | 0.467 | 28.70 |
| 15 | 0.01 dicoconut dimethyl ammonium chloride. | 0.103 | 59.88 | 0.285 | 36.10 | 0.401 | 38.78 |
| 16 | 0.005 coconut trimethyl ammonium chloride. / 0.005 dicoconut dimethyl ammonium chloride. | 0.095 | 63.03 | 0.252 | 43.5 | 0.460 | 29.77 |
| 17 | 0.01 dihydrogenated tallow dimethyl ammonium chloride. / 0.001 Makon 10. | 0.0942 | 62.9 | 0.2695 | 41.2 | 0.390 | 44.9 |
| 18 | 0.01 tallow trimethyl ammonium chloride. / 0.001 Makon 10. | 0.0760 | 68.6 | 0.274 | 41.4 | 0.421 | 39.3 |
| 19 | 0.01 coconut diethanol benzyl ammonium chloride. / 1 drop Makon 10. | 0.0440 | 78.4 | 0.1590 | 63.8 | 0.238 | 65.2 |
| 20 | 0.01 soya diethanol benzyl ammonium chloride. / 1 drop Makon 10. | 0.0883 | 56.5 | 0.223 | 49.2 | 0.425 | 37.9 |
| 21 | 0.01 γ lauryl oxypropyl, trimethyl ammonium chloride. / 1 drop Makon 10. | 0.1155 | 43.3 | 0.215 | 50.9 | 0.353 | 48.3 |
| 22 | 0.01 N-γ coconut oxypropyl-1,3 propylene diamine. / 0.001 Makon 10. | | | 9.2182 | 22.5 | 0.4308 | 21.0 |
| 23 | 0.01 N-γ coconut oxypropyl-1,3 propylene diamine. / 0.001 Makon 10. | 0.0297 | 87.7 | 0.117 | 74.9 | 0.203 | 70.7 |
| 24 | 0.01 N-γ coconut oxypropyl-1,3 propylene diamine monoacetate. / 0.001 Makon 10. | | | 0.2131 | 24.3 | 0.3531 | 35.3 |
| 25 | 0.01 N-γ coconut oxypropyl-1,3 propylene diamine monoacetate. / 0.001 Makon 10. | 0.0485 | 81.48 | 0.1487 | 69.46 | 0.3232 | 53.80 |

TABLE I.—Continued

| Example | Corrosion inhibitors, percent of brine | 24 Hours | | 48 Hours | | 72 Hours | |
|---|---|---|---|---|---|---|---|
| | | Percent Wt. loss | Percent Protection | Percent Wt. loss | Percent Protection | Percent Wt. loss | Percent Protection |
| 26 | 0.01 N-γ coconut oxypropyl-1,3 propylene diamine diacetate. <br> 0.001 Makon 10 | | | 0.2461 | 12.6 | 0.4339 | 20.4 |
| 27 | 0.01 N-γ coconut oxypropyl-1,3 propylene diamine diacetate. <br> 0.001 Makon 10 | 0.0560 | 78.62 | 0.1440 | 70.42 | 0.2919 | 58.28 |
| 28 | 0.01 N-γ coconut oxypropyl-dipropylene triamine triacetate. <br> 1 drop Makon 10 | 0.0855 | 56.9 | 0.214 | 50.1 | 0.3589 | 38.8 |
| 29 | 0.01 N-lauryl-β aminopropionic acid <br> 0.001 Makon 10 | 0.0474 | 84.08 | 0.1679 | 68.79 | 0.234 | 68.7 |
| 30 | 0.01 N-lauryl-β aminopropionic acid <br> 0.001 Makon 10 | 0.0372 | 85.51 | 0.103 | 79.5 | 0.177 | 75.7 |
| 31 | 0.05 partial sodium salt N-lauryl-β aminopropionic acid. | 0.0288 | 88.7 | 0.1052 | 78.2 | 0.1664 | 74.83 |
| 32 | 0.01 partial sodium salt N-lauryl-β aminopropionic acid. <br> 0.001 Makon 10 | 0.0689 | 76.86 | 0.2052 | 61.85 | 0.224 | 62.2 |
| 33 | 0.05 sodium N-coconut-β aminopropionate | 0.040 | 86.1 | 0.0926 | 82.4 | 0.147 | 81.7 |
| 34 | 0.05 disodium N-tallow-β iminodipropionate | 0.045 | 84.4 | 0.1631 | 69.0 | 0.223 | 72.3 |
| 35 | 0.01 sodium N-γ octyl oxypropyl-β aminopropionate. <br> 0.001 Makon 10 | 0.0362 | 82.00 | 0.1343 | 71.72 | 0.1905 | 74.17 |
| 36 | 0.01 sodium N-γ octyl oxypropyl-β aminopropionate. <br> 0.001 Makon 10 | 0.0319 | 85.4 | 0.0988 | 79.0 | 0.1872 | 71.8 |
| 37 | 0.01 sodium N-γ lauryl oxypropyl-β aminopropionate. <br> 0.001 Makon 10 | 0.0244 | 87.87 | 0.0902 | 81.01 | 0.1424 | 80.69 |
| 38 | 0.01 sodium N-γ lauryl oxypropyl-β aminopropionate. <br> 0.001 Makon 10 | 0.0332 | 85.8 | 0.0816 | 82.4 | 0.134 | 80.8 |
| 39 | 0.01 disodium N-γ octyl oxypropyl-β iminodipropionate. <br> 0.001 Makon 10 | 0.0350 | 82.60 | 0.1391 | 70.71 | 0.2570 | 65.15 |
| 40 | 0.01 disodium N-γ octyl oxypropyl-β iminodipropionate. <br> 0.001 Makon 10 | 0.0418 | 80.8 | 0.0945 | 79.9 | 0.2116 | 68.2 |
| 41 | 0.01 disodium N-γ lauryl oxypropyl-β iminodipropionate. <br> 0.001 Makon 10 | 0.0366 | 83.29 | 0.1267 | 73.32 | 0.1803 | 75.55 |
| 42 | 0.01 disodium N-γ lauryl oxypropyl-β iminodipropionate. <br> 0.001 Makon 10 | 0.03165 | 86.5 | 0.0990 | 78.6 | 0.1534 | 78.0 |
| 43 | 0.05 N-β soya amidoethyl-ethylene diamine | 0.1480 | 42.2 | 0.3381 | 30.0 | 0.4808 | 27.27 |
| 44 | 0.01 N-β soya amidoethyl-ethylene diamine. <br> 0.001 Makon 10 | 0.0489 | 83.57 | 0.1804 | 66.46 | 0.284 | 61.9 |
| 45 | 0.05 N-β tall oil amidoethylethylene diamine | 0.0648 | 74.7 | 0.2938 | 39.1 | 0.4963 | 24.93 |
| 46 | 0.05 N-β oleyl amidoethyl-ethanol amine | 0.0713 | 72.2 | 0.2609 | 47.2 | 0.3451 | 47.80 |
| 47 | 0.01 N-β oleyl amidoethyl-ethanol amine <br> 0.001 Makon 10 | 0.0503 | 83.10 | 0.1824 | 66.09 | 0.361 | 51.6 |
| 48 | 0.05 1-ethanol, 2-heptadecenyl imidazoline | 0.0768 | 52.59 | 0.334 | 41.3 | 0.2911 | 58.60 |
| 49 | 0.01 1-ethanol, 2-heptadecenyl imidazoline <br> 0.001 Makon 10 | 0.0731 | 75.44 | 0.2231 | 58.52 | 0.345 | 53.6 |

Table I illustrates tests performed with various cathodic passifiers as the sole corrosion inhibitor. Generally, the presence of cathodic passifiers alone does not provide sufficient protection against corrosion. Further, it is noted that in most instances the percent protection afforded by a cathodic passifier decreases over the period of 24 hours to 72 hours, indicating that the galvanic barrier established by the film of cathodic passifier is slowly washed away.

Table II illustrates similar tests carried out wherein the sole anti-corrosive agent present is an anodic passifier. The sodium chromate and potassium dichromate anodic passifiers provide increased percent protection from 24 hours to 72 hours, while the sodium nitrite anodic passifier provides decreased protection over the same period. It is believed that this difference occurs due to the solubility of the ammonia reduction product of the sodium nitrite anodic passifier which is removed from the TABLE II.—RATE OF CORROSION AND PERCENT PROTECTION OF COLD-ROLLED STEEL IN 10 PERCENT AQUEOUS SODIUM CHLORIDE BRINE

| Example | Corrosion inhibitors, percent of brine | 24 Hours | | 48 Hours | | 72 Hours | |
|---|---|---|---|---|---|---|---|
| | | Percent Wt. loss | Percent Protection | Percent Wt. loss | Percent Protection | Percent Wt. loss | Percent Protection |
| 50 | 0.01 sodium chromate | 0.1332 | 62.45 | 0.1900 | 69.51 | 0.2362 | 74.09 |
| 51 | 0.01 potassium dichromate | 0.1051 | 70.76 | 0.0951 | 84.79 | 0.1305 | 85.69 |
| 52 | 0.01 sodium nitrite | 0.2366 | 35.19 | 0.4417 | 29.35 | 0.7794 | 14.51 | surface of the metal panels and is not present in the coating of insoluble corrosion products that is formed.

rosion. Examples 57 and 58 were carried out utilizing Triton X-200, an anionic surface active agent, as a dispersing agent for the fatty acid diamine salt, and it is postulated that the presence of this particular dispersing agent in some manner affected the film forming properties of the fatty acid diamine salt and thereby reduced the percent protection provided by the anticorrosive salt composition.

TABLE III.—RATE OF CORROSION AND PERCENT PROTECTION OF COLD-ROLLED STEEL IN 10 PERCENT AQUEOUS SODIUM CHLORIDE BRINE

| Example | Corrosion inhibitors, percent of brine | 24 Hours | | 48 Hours | | 72 Hours | |
|---|---|---|---|---|---|---|---|
| | | Percent Wt. loss | Percent Protection | Percent Wt. loss | Percent Protection | Percent Wt. loss | Percent Protection |
| 53 | 0.01 sodium chromate<br>0.01 N-coconut-1,3 propylenediamine diacetate | 0.0163 | 81.19 | 0.0275 | 94.11 | 0.0406 | 94.77 |
| 54 | 0.01 sodium chromate<br>0.005 N-coconut-1,3 propylene diamine diacetate | 0.0185 | 76.03 | 0.0301 | 93.65 | 0.0594 | 92.57 |
| 55 | 0.01 sodium chromate<br>0.01 N-coconut-1,3 propylene diamine diacetate<br>0.001 Makon 10 | 0.0189 | 74.83 | 0.0269 | 92.94 | 0.0274 | 96.11 |
| 56 | 0.01 sodium chromate<br>0.01 N-coconut-1,3 propylene diamine diacetate<br>0.001 Makon 10 | 0.0189 | 91.33 | 0.0384 | 92.02 | 0.0382 | 94.69 |
| 57 | 0.01 sodium chromate<br>0.01 N-coconut-1,3 propylene diamine diacetate<br>0.01 Triton X-200 | 0.0449 | 73.67 | 0.1099 | 78.90 | 0.1802 | 76.90 |
| 58 | 0.01 sodium chromate<br>0.01 N-coconut-1,3 propylene diamine diacetate<br>0.001 Triton X-200 | 0.0370 | 80.47 | 0.1304 | 74.96 | 0.1700 | 78.21 |
| 59 | 0.01 sodium chromate<br>0.01 N-coconut-1,3 propylene diamine diacetate<br>0.001 Makon 10 | 0.0176 | 90.86 | 0.0306 | 94.49 | 0.0709 | 92.81 |
| 60 | 0.01 sodium chromate<br>0.01 N-coconut-1,3 propylene triamine triacetate<br>0.001 Makon 10<br>Dye | 0.0061 | 95.72 | 0.0186 | 96.98 | 0.0195 | 97.94 |
| 61 | 0.01 sodium chromate<br>0.005 N-coconut-1,3 propylene triamine triacetate<br>0.005 Makon 10<br>Dye | 0.0068 | 95.23 | 0.0175 | 97.16 | 0.0020 | 97.88 |
| 62 | 0.01 sodium chromate<br>0.01 N-coconut-1,3 propylene diamine diacetate<br>0.001 Makon 10 | 0.0251 | 93.02 | 0.0403 | 93.55 | 0.0576 | 93.68 |

Table III illustrates the anti-corrosive properties of a sodium chromate anodic passifier and alkyl diamine and alkyl triamine cathodic passifiers. It can be seen that each of the examples in Table III provides excellent corrosion protection, and in this connection, all of the examples in Table IV with the exception of Examples 57 and 58 provide in excess of 90 percent protection against corrosion.

TABLE IV.—RATE OF CORROSION AND PERCENT PROTECTION OF COLD-ROLLED STEEL IN 10 PERCENT AQUEOUS SODIUM CHLORIDE BRINE

| Example | Corrosion inhibitors, percent of brine | 24 Hours | | 48 Hours | | 72 Hours | |
|---|---|---|---|---|---|---|---|
| | | Percent Wt. loss | Percent Protection | Percent Wt. loss | Percent Protection | Percent Wt. loss | Percent Protection |
| 63 | 0.01 sodium nitrite<br>0.01 N-coconut-1,3 propylene diamine diacetate<br>0.001 Makon 10 | 0.0177 | 87.58 | 0.0867 | 87.75 | 0.1640 | 82.36 |
| 64 | 0.01 sodium nitrite<br>0.01 N-coconut-1,3 propylene diamine diacetate<br>0.01 Triton X-200 | 0.0527 | 72.19 | 0.1572 | 69.91 | 0.2689 | 65.53 |
| 65 | 0.01 sodium nitrite<br>0.01 N-coconut-1,3 propylene diamine diacetate<br>0.005 Triton X-200 | 0.0457 | 75.88 | 0.1045 | 79.94 | 0.2778 | 64.39 |
| 66 | 0.01 sodium nitrite<br>0.01 N-coconut-1,3 propylene diamine diacetate<br>0.001 Triton X-200 | 0.0403 | 78.73 | 0.1131 | 78.28 | 0.1968 | 74.77 |
| 67 | 0.01 sodium nitrite<br>0.01 N-coconut-1,3 propylene diamine diacetate<br>0.001 Makon 10<br>Dye | 0.0177 | 87.58 | 0.0867 | 87.75 | 0.1640 | 82.36 |
| 68 | 0.02 sodium nitrite<br>0.01 N-coconut-1,3 propylene diamine diacetate<br>0.001 Makon 10<br>Dye | 0.0539 | 84.04 | 0.0923 | 86.81 | 0.1552 | 83.07 |
| 69 | 0.01 sodium nitrite<br>0.01 N-coconut-1,3 propylene diamine diacetate<br>0.05 sodium ferrocyanide<br>0.001 Makon 10 | 0.0567 | 83.21 | 0.0848 | 87.88 | 0.1516 | 83.16 |
| 70 | 0.01 sodium nitrite<br>0.01 N-coconut-1,3 propylene triamine triacetate<br>0.001 Makon 10<br>Dye | 0.2188 | 35.23 | 0.1844 | 73.65 | 0.4107 | 55.20 |
| 71 | 0.01 sodium nitrite<br>0.005 N-coconut-3,1 propylene triamine triacetate<br>0.005 Makon 10<br>Dye | 0.1564 | 53.70 | 0.1740 | 75.14 | 0.3286 | 64.15 |
| 72 | 0.01 sodium nitrite<br>0.0025 N-coconut-1,3 propylene triamine triacetate<br>0.00025 Makon 10<br>Dye | 0.1233 | 63.50 | 0.2445 | 65.00 | 0.5697 | 37.85 |
| 73 | 0.01 sidium nitrite<br>0.01 tallow bis triacetate<br>0.001 Makon 10<br>Dye | 0.0799 | 76.35 | 0.3606 | 48.52 | 0.4186 | 54.24 |
| 74 | 0.01 sodium nitrite<br>0.01 N-coconut-1,3 propylene diamine diacetate<br>0.001 Makon 10 | 0.039 | 74.44 | 0.1135 | 81.85 | 0.2465 | 72.96 |

Table IV illustrates the anti-corrosive properties of a sodium nitrate anodic passifier and alkyl diamine and alkyl triamine cathodic passifiers. The percent protection obtained by the use of the combination of these anti-corrosive agents in aqueous sodium chloride solutions is in excess of the percent protection obtained using previously known anti-corrosive agents. Although the percent protection obtained is slightly lower than the percent protection obtained when an alkali metal chromate or dichromate is employed as the anodic passifier, substantially improved results are obtained when compared to the use of the anodic passifiers or cathodic passifiers by themselves.

Table V illustrates the corrosion protection of sodium chromate and sodium nitrite anodic pacifiers and alkyl quaternary ammonium cathodic pacifiers. It can be seen that quaternary ammonium compounds which contain an alkyl radical of from 8 to 24 carbon atoms and mixtures thereof function as cathodic passifiers, and when combined with an anodic passifier provide improved protection against corrosion in aqueous salt solutions.

TABLE V.—RATE OF CORROSION AND PERCENT PROTECTION OF COLD-ROLLED STEEL IN 10 PERCENT AQUEOUS SODIUM CHLORIDE BRINE

| Example | Corrosion inhibitors, percent of brine | 24 Hours | | 48 Hours | | 72 Hours | |
|---|---|---|---|---|---|---|---|
| | | Percent Wt. loss | Percent Protection | Percent Wt. loss | Percent Protection | Percent Wt. loss | Percent Protection |
| 75 | 0.01 coconut trimethyl ammonium chloride / 0.01 sodium chromate / 0.001 Makon 10 | 0.0309 | 88.92 | 0.0478 | 90.48 | 0.0575 | 92.34 |
| 76 | 0.01 coconut trimethyl ammonium chloride / 0.01 sodium chromate | 0.039 | 84.75 | 0.071 | 84.08 | 0.072 | 89.01 |
| 77 | 0.01 dicoconut dimethyl ammonium chloride / 0.01 sodium chromate / 0.001 Makon 10 | 0.0325 | 88.25 | 0.0637 | 88.73 | 0.0471 | 90.13 |
| 78 | 0.01 dicoconut dimethyl ammonium chloride / 0.01 sodium chromate | 0.051 | 80.08 | 0.101 | 77.35 | 0.157 | 76.03 |
| 79 | 0.005 coconut trimethyl ammonium chloride / 0.005 dicoconut dimethyl ammonium chloride / 0.01 sodium chromate / 0.001 Makon 10 | 0.0312 | 88.82 | 0.0425 | 91.54 | 0.0602 | 91.98 |
| 80 | 0.005 coconut trimethyl ammonium chloride / 0.005 dicoconut dimethyl ammonium chloride / 0.01 sodium chromate | 0.050 | 80.47 | 0.103 | 76.90 | 0.164 | 74.96 |
| 81 | 0.01 dihydrogenated tallow dimethyl ammonium chloride / 0.01 sodium chromate / 0.001 Makon 10 | 0.037 | 87.2 | 0.0520 | 90.1 | 0.0667 | 91.7 |
| 82 | 0.01 dihydrogenated tallow dimethyl ammonium chloride / 0.01 sodium chromate / 0.001 Makon 10 | 0.0475 | 70.68 | 0.074 | 87.0 | 0.0703 | 90.0 |
| 83 | 0.01 dihydrogenated tallow dimethyl ammonium chloride / 0.01 sodium chromate / 0.01 Makon 10 | 0.0260 | 89.94 | 0.0495 | 88.7 | 0.0645 | 90.4 |
| 84 | 0.01 tallow trimethyl ammonium chloride / 0.01 sodium chromate / 0.001 Makon 10 | 0.0393 | 83.91 | 0.0826 | 81.0 | 0.0389 | 87.5 |
| 85 | 0.01 tallow trimethyl ammonium cholride / 0.01 sodium chromate / 0.001 Makon 10 | 0.0382 | 84.36 | 0.0561 | 87.1 | 0.0510 | 92.4 |
| 86 | 0.01 tallow trimethyl ammonium chloride / 0.01 sodium chromate / 0.001 Makon 10 | 0.0366 | 84.9 | 0.0597 | 87.2 | 0.0729 | 89.5 |
| 87 | 0.01 coconut diethanol benzyl ammonium chloride / 0.01 sodium chromate / 1 drop Makon 10 | 0.0342 | 83.2 | 0.0545 | 87.6 | 0.0949 | 86.1 |
| 88 | 0.01 soya diethanol benzyl ammonium chloride / 0.01 sodium chromate / 1 drop Makon 10 | 0.0405 | 80.1 | 0.0957 | 78.2 | 0.112 | 83.6 |
| 89 | 0.01 γ-lauryl oxypropyl, trimethyl ammonium chloride / 0.01 sodium chromate / 1 drop Makon 10 | 0.0206 | 89.9 | 0.0541 | 87.7 | 0.127 | 81.4 |
| 90 | 0.01 dihydrogenated tallow dimethyl ammonium chloride / 0.01 sodium nitrite / 0.001 Makon 10 | 0.0873 | 65.6 | 0.2515 | 45.1 | 0.409 | 42.3 |
| 91 | 0.01 tallow trimethyl ammonium chloride / 0.01 sodium nitrite / 0.001 Makon 10 | 0.0494 | 79.6 | 0.220 | 52.9 | 0.402 | 42.0 |
| 92 | 0.01 coconut diethanol benzyl ammonium chloride / 0.01 sodium nitrite / 1 drop Makon 10 | 0.0501 | 75.4 | 0.1471 | 66.5 | 0.250 | 63.4 |
| 93 | 0.01 soya diethanol benzyl ammonium chloride / 0.01 sodium nitrite / 1 drop Makon 10 | 0.0747 | 63.3 | 0.1525 | 65.3 | 0.376 | 45.0 |
| 94 | 0.01 γ lauryl oxypropyl trimethyl ammonium chloride / 0.01 sodium nitrite / 1 drop Makon 10 | 0.0705 | 65.4 | 0.238 | 45.9 | 0.369 | 46.0 |

TABLE VI.—RATE OF CORROSION AND PERCENT PROTECTION OF COLD-ROLLED STEEL IN 10 PERCENT AQUEOUS SODIUM CHLORIDE BRINE

| Example | Corrosion inhibitors, percent of brine | 24 Hours | | 48 Hours | | 72 Hours | |
|---|---|---|---|---|---|---|---|
| | | Percent Wt. loss | Percent Protection | Percent Wt. loss | Percent Protection | Percent Wt. loss | Percent Protection |
| 95 | 0.01 N-γ coconut oxypropyl-1,3 propylene diamine. 0.01 sodium chromate. 0.001 Makon 10 | | | 0.0475 | 83.1 | 0.0913 | 83.3 |
| 96 | 0.01 N-γ coconut oxypropyl-1,3 propylene diamine. 0.01 sodium chromate. 0.001 Makon 10 | 0.0176 | 78.8 | 0.0388 | 91.3 | 0.1040 | 83.7 |
| 97 | 0.005 N-γ coconut oxypropyl-1,3 propylene diamine. 0.01 sodium chromate. 0.001 Makon 10 | 0.0208 | 75.0 | 0.0518 | 88.4 | 0.0830 | 87.4 |
| 98 | 0.01 N-γ coconut oxypropyl-1,3 propylene diamine monoacetate. 0.01 sodium chromate. 0.001 Makon 10 | | | 0.0447 | 84.1 | 0.0546 | 90.0 |
| 99 | 0.01 N-γ coconut oxypropyl-1,3 propylene diamine monoacetate. 0.01 sodium chromate. 0.001 Makon 10 | 0.0095 | 88.5 | 0.0402 | 91.0 | 0.0555 | 91.3 |
| 100 | 0.005 N-γ coconut oxypropyl-1,3 propylene diamine monoacetate. 0.01 sodium chromate. 0.001 Makon 10 | 0.0147 | 82.3 | 0.0312 | 93.0 | 0.0428 | 93.3 |
| 101 | 0.01 N-γ coconut oxypropyl-1,3 propylene diamine diacetate. 0.01 sodium chromate. 0.001 Makon 10 | | | 0.0543 | 80.7 | 0.0484 | 91.1 |
| 102 | 0.01 N-γ coconut oxypropyl-1,3 propylene diamine diacetate. 0.01 sodium chromate. 0.001 Makon 10 | 0.0129 | 84.5 | 0.0339 | 92.4 | 0.0773 | 87.9 |
| 103 | 0.005 N-γ coconut oxypropyl-1,3 propylene diamine diacetate. 0.01 sodium chromate. 0.001 Makon 10 | 0.0096 | 88.4 | 0.0308 | 93.1 | 0.0476 | 92.5 |
| 104 | 0.01 N-γ coconut oxypropyl-dipropylene triamine triacetate. 0.01 sodium chromate. 1 drop Makon 10 | 0.0257 | 87.1 | 0.0783 | 81.7 | 0.1178 | 79.9 |
| 105 | 0.01 N-coconut oxypropyl-1,3 propylene diamine. 0.01 sodium nitrite. 0.001 Makon 10 | 0.0425 | 82.4 | 0.1065 | 77.2 | 0.227 | 67.2 |
| 106 | 0.01 N-γ coconut oxypropyl-1,3 propylene diamine monoacetate. 0.01 sodium nitrite. 0.001 Makon 10 | 0.0489 | 81.33 | 0.1886 | 61.26 | 0.3696 | 47.17 |
| 107 | 0.01 N-γ coconut oxypropyl-1,3 propylene diamine diacetate. 0.01 sodium nitrite. 0.001 Makon 10 | 0.0502 | 80.83 | 0.1557 | 68.02 | 0.2928 | 58.15 |
| 108 | 0.01 N-γ coconut oxypropyl-dipropylene triamine triacetate. 0.01 sodium nitrite. 1 drop Makon 10 | 0.0502 | 74.7 | 0.1934 | 54.9 | 0.3739 | 36.2 |

TABLE VII.—RATE OF CORROSION AND PERCENT PROTECTION OF COLD-ROLLED STEEL IN 10 PERCENT AQUEOUS SODIUM CHLORIDE BRINE

| Example | Corrosion inhibitors, percent of brine | 24 Hours | | 48 Hours | | 72 Hours | |
|---|---|---|---|---|---|---|---|
| | | Percent Wt. loss | Percent Protection | Percent Wt. loss | Percent Protection | Percent Wt. loss | Percent Protection |
| 109 | 0.01 N-lauryl-β aminopropionic acid. 0.01 sodium chromate. 0.001 Makon 10 | 0.2881 | 10.56(?) | 0.0715 | 86.71 | 0.088 | 88.1 |
| 110 | 0.01 N-lauryl-β aminopropionic acid. 0.01 sodium chromate. 0.001 Makon 10 | | | 0.0332 | 88.2 | 0.0596 | 89.1 |
| 111 | 0.01 N-lauryl-β aminopropionic acid. 0.01 sodium chromate. 0.001 Makon 10 | 0.0206 | 91.98 | 0.030 | 94.1 | 0.0615 | 91.6 |
| 112 | 0.01 partial sodium salt N-lauryl-β aminopropionic acid. 0.01 sodium chromate. 0.001 Makon 10 | 0.0231 | 91.0 | 0.0696 | 85.6 | 0.0656 | 90.08 |
| 113 | 0.01 partial sodium salt N-lauryl-β aminopropionic acid. 0.01 sodium chromate. 0.001 Makon 10 | 0.0289 | 82.16 | 0.071 | 87.6 | 0.1015 | 85.56 |
| 114 | 0.01 sodium chromate. 0.001 Makon 10 | 0.0224 | 91.28 | 0.047 | 90.8 | 0.0631 | 91.3 |
| 115 | 0.01 sodium N-coconut-β aminopropionate. 0.01 sodium chromate. 0.001 Makon 10 | 0.028 | 90.3 | 0.0860 | 83.7 | 0.128 | 84.1 |
| 116 | 0.01 sodium N-coconut-β aminopropionate. 0.01 sodium chromate. 0.001 Makon 10 | 0.0413 | 74.81 | 0.069 | 87.9 | 0.1035 | 85.28 |
| 117 | 0.01 disodium N-tallow-β iminodipropionate. 0.01 sodium chromate. 0.001 Makon 10 | 0.045 | 84.4 | 0.0835 | 84.2 | 0.147 | 81.7 |
| 118 | 0.01 disodium N-tallow-β iminodipropionate. 0.01 sodium chromate. 0.001 Makon 10 | 0.0451 | 72.16 | 0.092 | 83.8 | 0.1327 | 81.13 |
| 119 | 0.01 N-lauryl-β aminopropionic acid. 0.01 sodium nitrite. 0.001 Makon 10 | 0.0408 | 84.11 | 0.0905 | 82.3 | 0.1505 | 79.4 |
| 120 | 0.01 partial sodium salt N-lauryl-β aminopropionic acid. 0.01 sodium nitrite. 0.001 Makon 10 | 0.0293 | 88.59 | 0.134 | 73.8 | 0.236 | 67.6 |

Table VI illustrates the improved resistance to corrosion in aqueous salt solutions provided by sodium chromate and sodium nitrate anodic passifiers in combination with N-γ alkyl oxypropyl-diamines and triamines and salts thereof. As discussed above, the slightly lesser percent protection obtained when sodium nitrate is used as the anodic passifier is believed to be due to the fact that the ammonia reduction product is soluble and is not retained at the surface of the metal plate.

TABLE VIII.—RATE OF CORROSION AND PERCENT PROTECTION OF COLD-ROLLED STEEL IN 10 PERCENT AQUEOUS SODIUM CHLORIDE BRINE

| Example | Corrosion inhibitors, percent of brine | 24 Hours | | 48 Hours | | 72 Hours | |
|---|---|---|---|---|---|---|---|
| | | Percent Wt. loss | Percent Protection | Percent Wt. loss | Percent Protection | Percent Wt. loss | Percent Protection |
| 121 | 0.01 sodium N-γ octyl oxypropyl-β aminopropionate. / 0.01 sodium chromate. / 0.001 Makon 10 | 0.0193 | 90.40 | 0.0366 | 92.29 | 0.0489 | 93.37 |
| 122 | 0.01 sodium N-γ octyl oxypropyl-β aminopropionate. / 0.01 sodium chromate. / 0.001 Makon 10 | 0.0199 | 90.9 | 0.0573 | 87.8 | 0.0656 | 90.1 |
| 123 | 0.01 sodium N-γ lauryl oxypropyl-β aminopropionate. / 0.01 sodium chromate. / 0.001 Makon 10 | 0.0239 | 88.12 | 0.0362 | 92.38 | 0.0564 | 92.35 |
| 124 | 0.01 sodium N-γ lauryl oxypropyl-β aminopropionate. / 0.01 sodium chromate. / 0.001 Makon 10 | 0.0210 | 91.0 | 0.0583 | 87.4 | 0.0892 | 87.2 |
| 125 | 0.01 disodium N-γ octyl oxypropyl-β iminodipropionate. / 0.01 sodium chromate. / 0.001 Makon 10 | 0.0216 | 89.26 | 0.0366 | 92.29 | 0.0502 | 93.19 |
| 126 | 0.01 disodium N-γ octyl oxypropyl-β iminodipropionate. / 0.01 sodium chromate. / 0.001 Makon 10 | 0.0280 | 87.2 | 0.0699 | 85.2 | 0.0917 | 86.2 |
| 127 | 0.01 disodium N-γ lauryl oxypropyl-β iminodipropionate / 0.01 sodium chromate. / 0.001 Makon 10 | 0.0118 | 94.13 | 0.0408 | 91.41 | 0.0593 | 91.96 |
| 128 | 0.01 disodium N-γ lauryl oxypropyl-β iminodipropionate. / 0.01 sodium chromate. / 0.001 Makon 10 | 0.0234 | 90.0 | 0.0566 | 87.8 | 0.0735 | 89.5 |
| 129 | 0.01 sodium N-γ octyl oxypropyl-β aminopropionate / 0.01 sodium nitrite. / 0.001 Makon 10 | 0.0275 | 87.4 | 0.0824 | 82.5 | 0.1487 | 77.6 |
| 130 | 0.01 sodium N-γ lauryl oxypropyl-β aminopropionate. / 0.01 sodium nitrite. / 0.001 Makon 10 | 0.0310 | 86.8 | 0.0619 | 86.7 | 0.122 | 82.5 |
| 131 | 0.01 disodium N-γ octyl oxypropyl-β iminodipropionate / 0.01 sodium nitrite. / 0.001 Makon 10 | 0.0346 | 84.1 | 0.1152 | 75.5 | 0.1843 | 72.3 |
| 132 | 0.01 disodium N-γ lauryl oxypropyl-β iminodipropionate / 0.01 sodium nitrite. / 0.001 Makon 10 | 0.0358 | 84.7 | 0.0835 | 82.0 | 0.122 | 82.5 |

TABLE IX.—RATE OF CORROSION AND PERCENT PROTECTION OF COLD-ROLLED STEEL IN 10 PERCENT AQUEOUS SODIUM CHLORIDE BRINE

| Example | Corrosion inhibitors, percent of brine | 24 Hours | | 48 Hours | | 72 Hours | |
|---|---|---|---|---|---|---|---|
| | | Percent Wt. loss | Percent Protection | Percent Wt. loss | Percent Protection | Percent Wt. loss | Percent Protection |
| 133 | 0.01 N-β soya amidoethyl-ethylene diamine / 0.01 sodium chromate / 0.001 Makon 10 | 0.0416 | 83.7 | 0.1053 | 78.2 | 0.1430 | 78.37 |
| 134 | 0.01 N-β soya amidoethyl-ethylene diamine / 0.01 sodium chromate / 0.001 Makon 10 | 0.0351 | 78.33 | 0.087 | 84.7 | 0.0858 | 87.80 |
| 135 | 0.01 N-β tall oil amidoethyl-ethylene diamine / 0.01 sodium chromate / 0.001 Makon 10 | 0.0515 | 79.9 | 0.0994 | 79.4 | 0.1432 | 78.34 |
| 136 | 0.01 N-β tall oil amidoethyl-ethylene diamine / 0.01 sodium chromate / 0.001 Makon 10 | 0.0421 | 74.01 | 0.111 | 80.5 | 0.1471 | 79.08 |
| 137 | 0.01 N-β oleyl amidoethyl-ethanol amine / 0.01 sodium chromate / 0.001 Makon 10 | 0.0256 | 90.0 | 0.0881 | 81.8 | 0.1674 | 74.68 |
| 138 | 0.01 N-β oleyl amidoethyl-ethanol amine / 0.01 sodium chromate / 0.001 Makon 10 | 0.0320 | 80.25 | 0.083 | 86.1 | 0.1428 | 79.69 |
| 139 | 0.01 1-ethanol, 2-heptadecenyl imidazoline / 0.01 sodium chromate / 0.001 Makon 10 | 0.0524 | 67.65 | 0.128 | 77.4 | 0.1165 | 83.43 |

Tables VII, VIII and IX are similar to the previous tables and illustrate the anti-corrosive properties of additional cathodic passifiers in combination with sodium chromate and sodium nitrate anodic passifiers. Table VII illustrates the protection afforded by N-alkyl-β aminopropionic acids and dipropionic acids in combination with an anodic passifier and Table VIII illustrates the protection afforded by N-γ alkyl oxypropyl-β aminopropionic acids and dipropionic acids in combination with an anodic passifier.

Table IX illustrates the corrosion protection afforded by N-β alkyl amidoethyl-ethylene diamines, N-β alkyl amidoethyl-ethanol amines and 1-ethanol, 2-alkyl imidozoline in combination with a sodium chromate anodic passifier.

Table X illustrates the improved anticorrosive characteristics of the described anticorrosive salt in actual field tests. Cold-rolled steel panels, similar in composition to those employed in the previous tables, three inches wide by six inches long and having a 16 gauge thickness are employed in each of the field tests. The mechanically sheared edges of the panels are sanded smooth and the surfaces of the panels are lightly sanded. The panels are then degreased with a five to one solution of carbon tetrachloride and benzene. The panels are cleaned with a detergent, rinsed with water and dried in a desiccator under vacuum. The panels are attached vertically to the fenders of various cars in a manner so that the panel is parallel to the tire tread.

A blacktop area of approximately 7,000 square feet is used for each test. 60 pounds of salt are evenly distributed over the test area each day and the test area is sprinkled with water twice each day that it does not rain or snow. Cars are driven through the test area for approximately three miles twice each day and each car is parked in the open between each test run. The panels attached to the cars driven through the areas sprinkled with salt containing an anodic passifier and a cathodic passifier in accordance with the present invention are compared against like panels attached to cars driven through areas containing untreated rock salt. The percent weight loss and percent protection are determined in the manner described above.

TABLE X.—CORROSION OF COLD-ROLLED STEEL PANELS DURING ROAD TEST

| Example | Days driven | Corrosion inhibitors, percent by weight of salt | Percent weight loss, average | Percent protection average |
|---|---|---|---|---|
| 140 | 7 | 0.1 sodium nitrite<br>0.1 N-γ coconut-1,3 propylene diamine diacetate. | 0.5068 | 59.57 |
| 141 | 11 | 0.1 sodium nitrite<br>0.1 N-γ coconut-1,3 propylene diamine diacetate. | 0.5809 | 60.72 |
| 142 | 7 | 0.1 sodium nitrite<br>0.1 N-γ coconut-1,3 propylene diamine diacetate. | 0.5281 | 57.07 |
| 143 | 14 | 0.1 sodium nitrite<br>0.1 N-γ coconut-1,3 propylene diamine diacetate. | 0.7867 | 52.33 |
| 144 | 7 | 0.1 sodium nitrite<br>0.1 N-γ coconut-1,3 propylene diamine diacetate. | 0.5175 | 68.33 |
| 145 | 14 | 0.1 sodium nitrite<br>0.1 N-γ coconut-1,3 propylene diamine diacetate. | 0.6838 | 56.29 |

Table X illustrates the substantially improved corrosion protection obtained under simulated driving conditions with salt treated with an anodic pacifier and a cathodic pacifier. Over periods of up to 14 days, salt containing an anodic passifier and a cathodic passifier provided from 50 to 60 percent protection when compared to salt which did not contain a corrosion preventative agent.

Identical road tests were also carried out using sodium hexametaphosphate as the sole anti-corrosive agent in the salt composition. The sodium hexametaphosphate treated salt provided about 30 percent protection against corrosion after seven days as compared to untreated rock salt. However, after fourteen days, the sodium hexametaphosphate treated salt was totally ineffective and provided 0 percent protection against corrosion. However, salt containing a sodium nitrite anodic passifier and a N-coconut-1,3 propylene diamine diacetate cathodic passifier provided greater than 50 percent protection against corrosion. The percent protection afforded by the salt containing a sodium nitrite anodic passifier and a N-coconut-1,3 propylene diamine diacetate cathodic passifier remained substantially the same from the seventh day to the fourteenth day while the protection afforded by salt treated with sodium hexametaphosphate dropped from 30 percent protection to substantially no protection.

It can be seen that a salt composition has been provided which has substantially increased protection against corrosion in an aqueous solution. The salt composition provides increased protection against corrosion over an extended period of time and the anti-corrosive agents are not diluted or washed from the metal surface during extended exposure to moisture and/or driving conditions. Further, the present invention provides an improved combination of anti-corrosive agents which, in an aqueous solution, provide increased protection against corrosion in the presence of corrosive salts.

Although certain features of the invention have been set forth with particularity in order to describe the invention, other alternative embodiments within the skill of the art are contemplated.

Various of the features of the invention are set forth in the following claims.

What is claimed is:

1. A salt composition for de-icing having improved corrosion inhibiting properties in respect to automobile bodies and trim comprising, a water soluble sodium or calcium de-icing salt, a minor but effective amount of an anodic passifier selected from the group consisting of alkali metal chromates and alkali metal nitrites, and a minor but effective amount of at least one cationic surface active agent cathodic passifier selected from the group consisting of compounds of the formulae

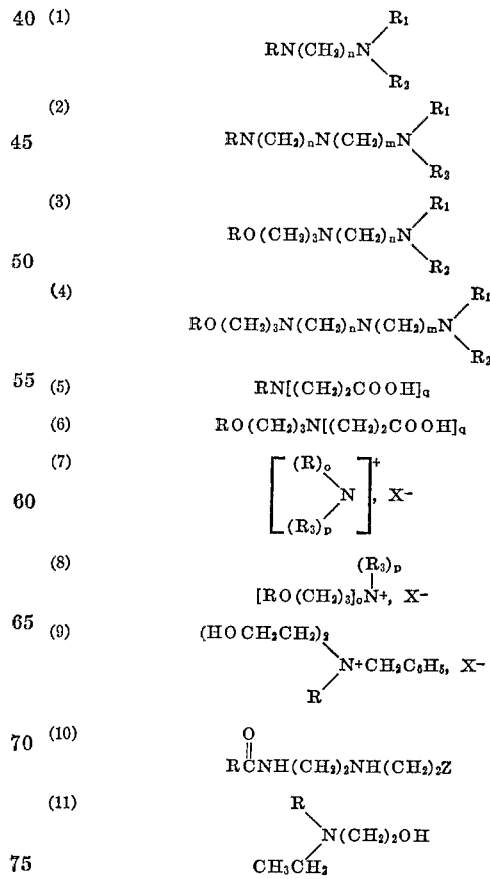

(12) 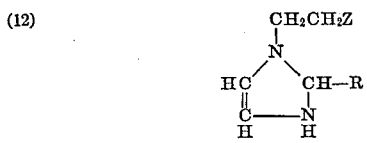

where:

R = an alkyl radical of from 8 to 24 carbon atoms
$R_1$ = hydrogen or a short chain alkyl radical of from 1 to 6 carbon atoms
$R_2$ = hydrogen or a short chain alkyl radical of from 1 to 6 carbon atoms
$R_3$ = a short chain alkyl radical of from 1 to 6 carbon atoms
X = a salt forming radical
Z = an amino or hydroxyl radical
n = 2 to 10
m = 2 to 10
o = 1 to 3
p = 1 to 3 and the sum of o and p is 4
q = 1 or 2
r = 0 or 1 and the sum of q and r is 2 and soluble salts thereof.

2. A salt composition for de-icing having improved corrrosion inhibiting properties in respect to automobile bodies and trim comprising, a water soluble sodium or calcium deicing salt, a minor but effective amount of an alkali metal chromate anodic passifier, and a minor but effective amount of at least one cationic surface active agent cathodic passifier selected from the group consisting of compounds of the formulae

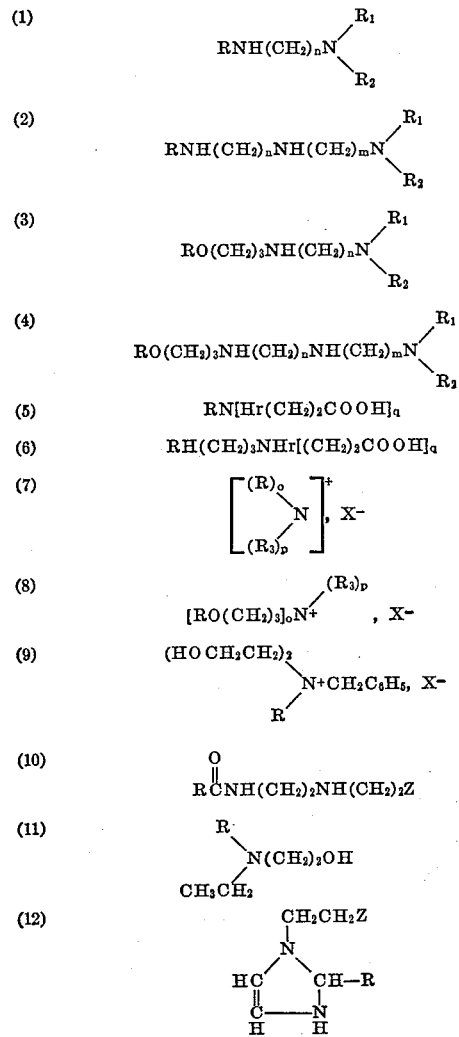

3. A salt composition for de-icing having improved corrosion inhibiting properties in respect to automobile bodies and trim comprising, a water soluble sodium or calcium de-icing salt, a minor but effective amount of an alkali metal nitrite anodic passifier, and a minor but effective amount of at least one cationic surface active agent cathodic passifier selected from the group consisting of compounds of the formulae

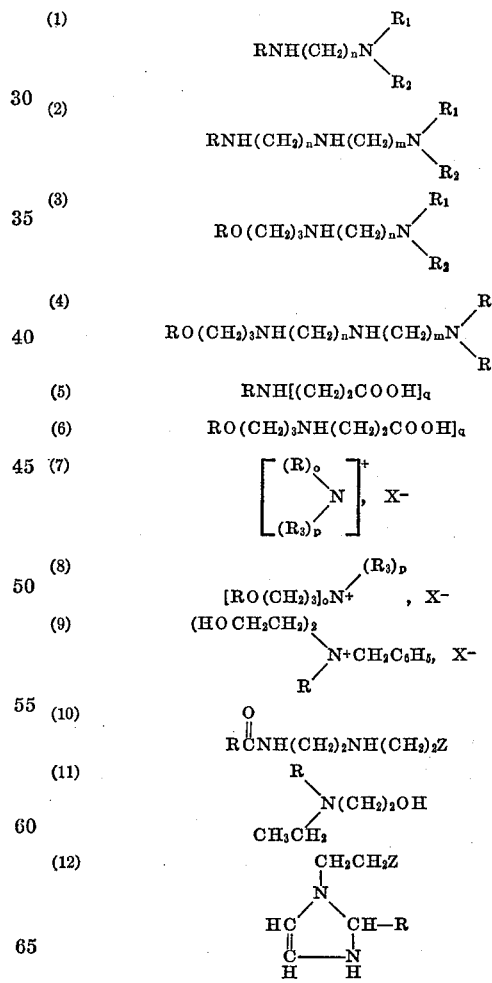

where:

R = an alkyl radical of from 8 to 24 carbon atoms
$R_1$ = hydrogen or a short chain alkyl radical of from 1 to 6 carbon atoms
$R_2$ = hydrogen or a short chain alkyl radical of from 1 to 6 carbon atoms
$R_3$ = a short chain alkyl radical of from 1 to 6 carbon atoms $X$ = a salt forming radical
$Z$ = an amino or hydroxyl radical
$n$ = 2 to 10
$m$ = 2 to 10
$o$ = 1 to 3
$p$ = 1 to 3 and the sum of $o$ and $p$ is 4
$q$ = 1 or 2
$r$ = 0 or 1 and the sum of $q$ and $r$ is 2 and soluble salts thereof.

4. A salt composition for de-icing having improved corrosion inhibiting properties in respect to automobile bodies and trim comprising, a water soluble sodium or calcium halide de-icing salt, at least about 0.05 percent by weight of said salt of an alkali metal chromate or dichromate, and at least about 0.01 percent by weight of said salt of a compound of the formula

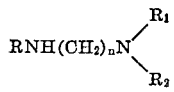

and soluble salts thereof, where $R$ = an alkyl radical of from 8 to 24 carbon atoms, $R_1$ and $R_2$ = hydrogen or a short chain alkyl radical of from 1 to 6 carbon atoms, and $n$ = 2 to 10.

5. A salt composition for de-icing having improved corrosion inhibiting properties in respect to automobile bodies and trim comprising, a water soluble sodium or calcium de-icing salt, a minor but effective amount of an alkali metal chromate or dichromate anodic passifier, and a minor but effective amount of at least one cationic surface active agent cathodic passifier selected from the group consisting of compounds of the formulae

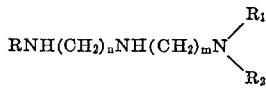

where $R$ = an alkyl radical of from 8 to 24 carbon atoms, $R_1$ and $R_2$ = hydrogen or a short chain alkyl radical of from 1 to 6 carbon atoms, $n$ = 2 to 10, and $m$ = 2 to 10.

6. A salt composition for de-icing having improved corrosion inhibiting properties in respect to automobile bodies and trim comprising, a water soluble sodium or calcium de-icing salt, a minor but effective amount of an alkali metal chromate or dichromate anodic passifier, and a minor but effective amount of at least one cationic surface active agent cathodic passifier selected from the group consisting of compounds of the formula

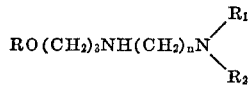

where $R$ = an alkyl radical of from 8 to 24 carbon atoms, $R_1$ and $R_2$ = hydrogen or a short chain alkyl radical of from 1 to 6 carbon atoms, and $n$ = 2 to 10.

7. A salt composition for de-icing having improved corrosion inhibiting properties in respect to automobile bodies and trim comprising, a water soluble sodium or calcium de-icing salt, a minor but effective amount of an alkali metal chromate or dichromate anodic passifier, and a minor but effective amount of at least one cationic surface active agent cathodic passifier selected from the group consisting of compounds of the formula

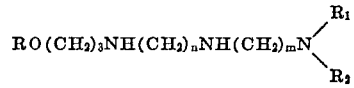

where $R$ = an alkyl radical of from 8 to 24 carbon atoms, $R_1$ and $R_2$ = hydrogen or a short chain alkyl radical of from 1 to 6 carbon atoms, $n$ = 2 to 10, and $m$ = 2 to 10.

8. A salt composition for de-icing having improved corrosion inhibiting properties in respect to automobile bodies and trim comprising, a water soluble sodium or calcium de-icing salt, a minor but effective amount of an alkali metal chromate or dichromate anodic passifier, and a minor but effective amount of at least one cationic surface active agent cathodic passifier selected from the group consisting of compounds of the formula

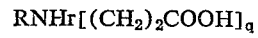

where $R$ = an alkyl radical of from 8 to 24 carbon atoms, $q$ = 1 or 2, $r$ = 0 or 1 and the sum of $q$ and $r$ is 2.

9. A salt composition for de-icing having improved corrosion inhibiting properties in respect to automobile bodies and trim comprising, a water soluble sodium or calcium de-icing salt, a minor but effective amount of an alkali metal chromate or dichromate anodic passifier, and a minor but effective amount of at least one cationic surface active agent cathodic passifier selected from the group consisting of compounds of the formula

where $R$ = an alkyl radical of from 8 to 24 carbon atoms, $q$ = 1 or 2, $r$ = 0 or 1 and the sum of $q$ and $r$ is 2.

10. A salt composition for de-icing having improved corrosion inhibiting properties in respect to automobile bodies and trim comprising, a water soluble sodium or calcium de-icing salt, a minor but effective amount of an alkali metal chromate or dichromate anodic passifier, and a minor but effective amount of at least one cationic surface active agent cathodic passifier selected from the group consisting of compounds of the formula

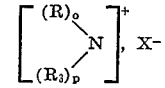

where $R$ = an alkyl radical of from 8 to 24 carbon atoms, $R_3$ = a short chain alkyl radical of from 1 to 6 carbon atoms, $X$ = a salt forming radical, $o$ = 1 to 3, $p$ = 1 to 3, and the sum of $o$ and $p$ is 4.

11. A salt composition for de-icing having improved corrosion inhibiting properties in respect to automobile bodies and trim comprising, a water soluble sodium or calcium de-icing salt, a minor but effective amount of an alkali metal chromate or dichromate anodic passifier, and a minor but effective amount of at least one cationic surface active agent cathodic passifier selected from the group consisting of compounds of the formula

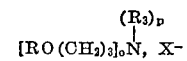

where $R$ = an alkyl radical of from 8 to 24 carbon atoms, $R_3$ = a short chain alkyl radical of from 1 to 6 carbon atoms, $X$ = a salt forming radical, $o$ = 1 to 3, $p$ = 1 to 3, and the sum of $o$ and $p$ is 4.

12. A salt composition for de-icing having improved corrosion inhibiting properties in respect to automobile bodies and trim comprising, a water soluble sodium or calcium de-icing salt, a minor but effective amount of an alkali metal chromate or dichromate anodic passifier, and a minor but effective amount of at least one cationic surface active agent cathodic passifier selected from the group consisting of compounds of the formula

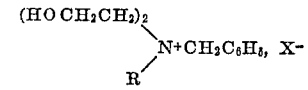

where $R$ = an alkyl radical of from 8 to 24 carbon atoms and $X$ = a salt forming radical.

13. A salt composition for de-icing having improved corrosion inhibiting properties in respect to automobile bodies and trim comprising, a water soluble sodium or calcium de-icing salt, a minor but effective amount of an alkali metal chromate or dichromate anodic passifier, and a minor but effective amount of at least one cationic surface active agent cathodic passifier selected from the group consisting of compounds of the formula

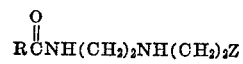

where R=an alkyl radical of from 8 to 24 carbon atoms and Z=an amino or hydroxyl radical.

14. A salt composition for de-icing having improved corrosion inhibiting properties in respect to automobile bodies and trim comprising, a water soluble sodium or calcium de-icing salt, a minor but effective amount of an alkali metal chromate or dichromate anodic passifier, and a minor but effective amount of at least one cationic surface active agent cathodic passifier selected from the group consisting of compounds of the formula

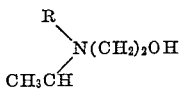

where R=an alkyl radical of from 8 to 24 carbon atoms.

15. A salt composition for de-icing having improved corrosion inhibiting properties in respect to automobile bodies and trim comprising, a water soluble sodium or calcium de-icing salt, a minor but effective amount of an alkali metal chromate or dichromate anodic passifier, and a minor but effective amount of at least one cationic surface active agent cathodic passifier selected from the group consisting of compounds of the formula

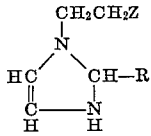

where R=an alkyl radical of from 8 to 24 carbon atoms and Z=an amino or hydroxyl radical.

16. A method of treating a de-icing salt for melting ice and snow to improve the anti-corrosive properties thereof comprising, admixing with a sodium or calcium de-icing salt at least about 0.05 percent by weight of said salt of an anodic passifier selected from the group consisting of alkali metal chromates, and alkali metal nitrites and at least about 0.01 percent by weight of said salt of at least one cationic surface active agent cathodic passifier selected from the group consisting of compound of the formulae

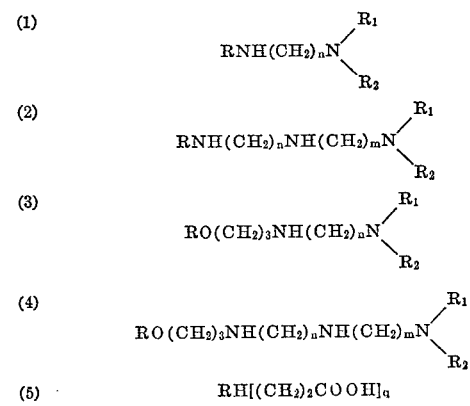

(6) $RO(CH_2)_3NH[(CH_2)_2COOH]$ (7) 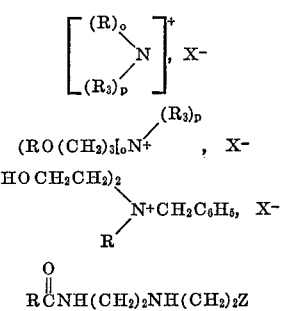

(8)

(9) $(HOCH_2CH_2)_2$

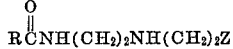

(10) $$\underset{\text{R}}{\overset{\text{O}}{\text{R}\overset{\|}{\text{C}}\text{NH}(CH_2)_2\text{NH}(CH_2)_2\text{Z}}}$$

(11)

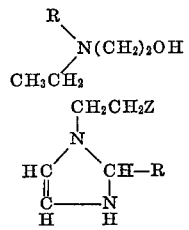

(12)

where:

R=an alkyl radical of from 8 to 24 carbon atoms
$R_1$=hydrogen or a short chain alkyl radical of from 1 6 carbon atoms
$R_2$=hydrogen or a short chain alkyl radical of from 1 to 6 carbon atoms
$R_3$=a short chain alkyl radical of from 1 to 6 carbon atoms
X=a salt forming radical
Z=an amino or hydroxyl radical
n=2 to 10
m=2 to 10
o=1 to 3
p=1 to 3 and the sum of o and p is 4
q=1 or 2
r=0 or 1 and the sum of q and r is 2 and soluble salts thereof, at least one of said anodic passifier and said cathodic passifier being applied to said salt in the form of an aqueous solution thereof, and distributing said anodic passifier and said cathodic passifier substantially uniformly throughout said salt

References Cited
UNITED STATES PATENTS
3,227,654  1/1966  Standish et al. _____ 252—70

OTHER REFERENCES
Technical Bulletin, Duomeens, Armour Industrial Chemical Co., 1958, pp. 3, 9.

LEON D. ROSDOL, *Primary Examiner.*

S. D. SCHWARTZ, *Assistant Examiner.*

UNITED STATES PATENT OFFICE
CERTIFICATE OF CORRECTION

Patent No. 3,384,590                                                            May 21, 1968

Russell A. Eversole et al.

It is certified that error appears in the above identified patent and that said Letters Patent are hereby corrected as shown below:

Column 2, lines 19 to 22, the formula should appear as shown below:

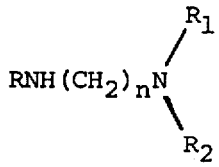

same column 2, lines 25 to 28, the formula should appear as shown below:

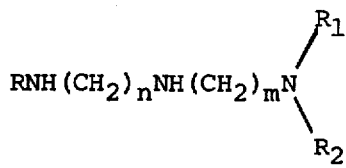

same column 2, lines 30 to 34, the formula should appear as shown below:

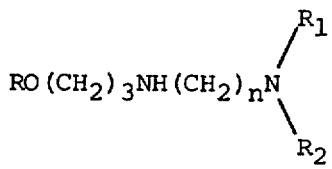

same column 2, line 42, "$RNH[(CH_2)_2COOH]_q$" should read -- $RNH_r[(CH_2)_2COOH]_q$ --; line 45, "$RO(CH_2)_3NH[(CH_2)_2COOH]_q$" should read -- $RO(CH_2)_3NH_r[(CH_2)_2COOH]_q$ --. Column 3, between lines 20 and 21, insert -- m = 2 to 10 --. Column 5, line 50, "manufatured" and "dray" should read -- manufactured -- and -- dry --. Column 6, line 51, after "sodium" insert -- chromate --. Columns 7 and 8, TABLE I, second column, line 45 thereof, "cocomut" should read -- coconut --; same columns, same table, fifth column, line 22 thereof, "9.2182" should read -- 0.2182 --. Columns 9 and 10, TABLE II, sixth column, line 1 thereof, "69.51" should read -- 69.61 --. Columns 11 and 12, TABLE IV, first column, line 30 thereof, "3,1" should read -- 1,3 --; same table, eighth column, line 11 thereof, "54.24" should read -- 54.34 --; same table, third column, line 12 thereof, "0.039" should read -- 0.0739 --. Columns 13 and 14, TABLE V, second column, line 29 thereof, "0.01 Makon 10" should read -- 0.001 Makon 10 --; same table, seventh column, line 10 thereof, "0.0389" should read -- 0.0839 --. Columns 15 and 16, TABLE VI, second column, line 7 thereof, after "diamine" cancel "1"; same table, seventh column, line 3 thereof, "0.0830" should read -- 0.0803 --.

3,384,590
(2)
Column 19, line 4, "nitrate" should read -- nitrite --. Column 20, lines 39 to 57, formulas 1 to 6, should appear as shown below:
(1) 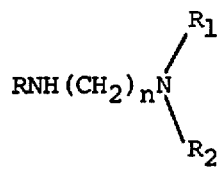
(2) 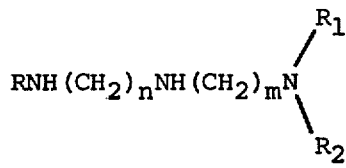
(3) 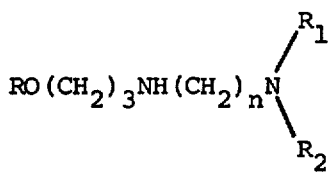
(4) 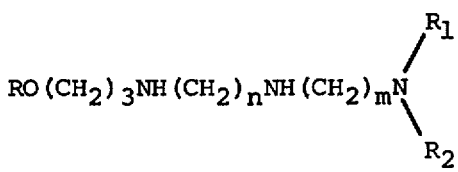
(5) 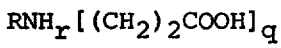
(6) 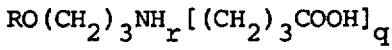
Column 21, formula (5) should appear as shown below:
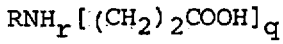
same column 21, formula (6) should appear as shown below:
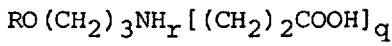
Column 22, formula (5) should appear as shown below:
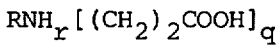
same column 22, formula (6) should appear as shown below:
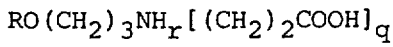
Column 24, line 4, "RNHr" should read -- $RNH_r$ --; line 16, "NHr[CH$_2$" should read $--NH_r[(CH_2--$; lines 44 to 46, the formula should appear as shown below:

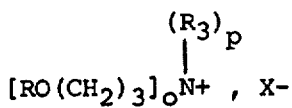

$$[RO(CH_2)_3]_o \overset{(R_3)_p}{N^+}, X-$$

Column 25, lines 11 to 14, the formula should appear as shown below:

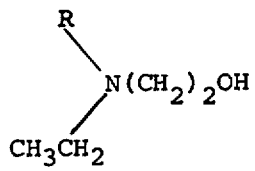

$$\begin{array}{c} R \\ \diagdown \\ \diagup \\ CH_3CH_2 \end{array} N(CH_2)_2OH$$

same column 25, line 58, "RH[" should read -- $RNH_r[$ --. Column 26, line 1, "NH[" should read -- $NH_r[$ --; line 28, after "1" insert -- to --.

Signed and sealed this 24th day of March 1970.

(SEAL)
Attest:

EDWARD M. FLETCHER, JR.
Attesting Officer

WILLIAM E. SCHUYLER, JR.
Commissioner of Patents